Figure 1:
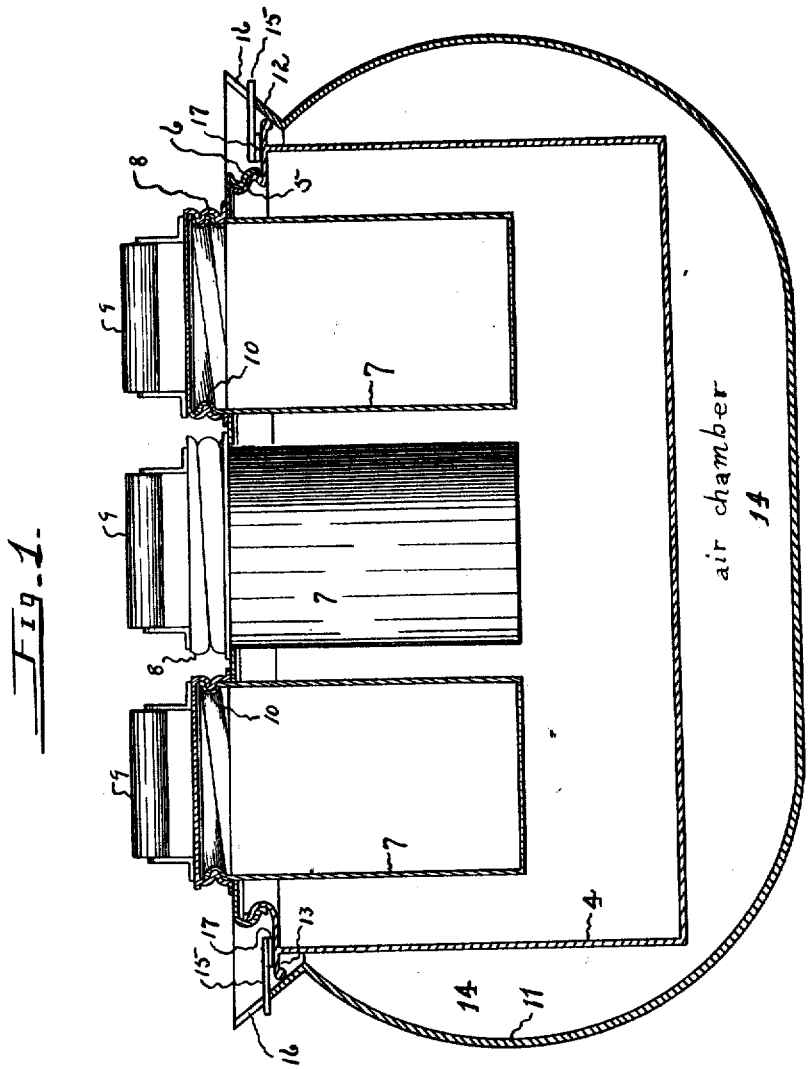

A. O. McCANN.
ICE CREAM FREEZER.
APPLICATION FILED AUG. 8, 1910.

998,708.

Patented July 25, 1911.
2 SHEETS—SHEET 2.

Witnesses
Wm. C. Davis.
George Henderson

Inventor
Alice O. McCann,
By Hiram A. Sturges,
Attorney

UNITED STATES PATENT OFFICE.

ALICE O. McCANN, OF COUNCIL BLUFFS, IOWA.

ICE-CREAM FREEZER.

998,708. Specification of Letters Patent. Patented July 25, 1911.

Application filed August 8, 1910. Serial No. 576,052.

*To all whom it may concern:*

Be it known that I, ALICE O. MCCANN, a citizen of the United States, residing at Council Bluffs, in the county of Pottawattamie and State of Iowa, have invented certain new and useful Improvements in Ice-Cream Freezers, of which the following is a specification.

This invention relates to improvements in ice cream freezers and has for its object, broadly, to provide an article of this class by means of which liquid food products may be quickly frozen, and which will comprise parts convenient in use and economical in manufacture.

While the description relates to a device for freezing cream, it may of course be used for freezing other foods.

One of the objects is to provide a container for the refrigerant which will be convenient for manually agitating or horizontally reciprocating the same, to congeal the contents of the cream receptacles.

Another object is to provide an air chamber circumscribing the more exposed parts of the brine-tank to prevent precipitation of moisture or absorption of heat, from the atmosphere.

The invention also includes parts so constructed and arranged that they will be convenient for assembling, and will be accessible for purposes of cleaning.

With these and other objects in view, the invention consists of the novel construction, combination and arrangement of parts as described herein and claimed, and as illustrated in the drawing, it being understood that changes in form, size, proportion and minor details may be made within the scope of the claims without departing from the spirit of the invention, or sacrificing any of its advantages.

Figure 2:
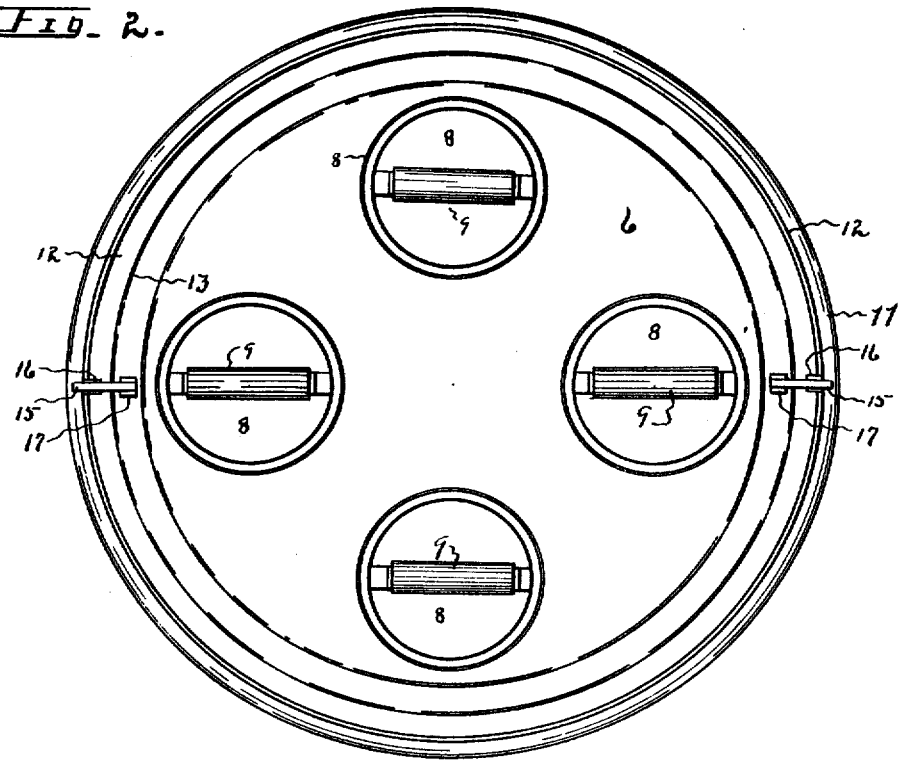
Figure 3:
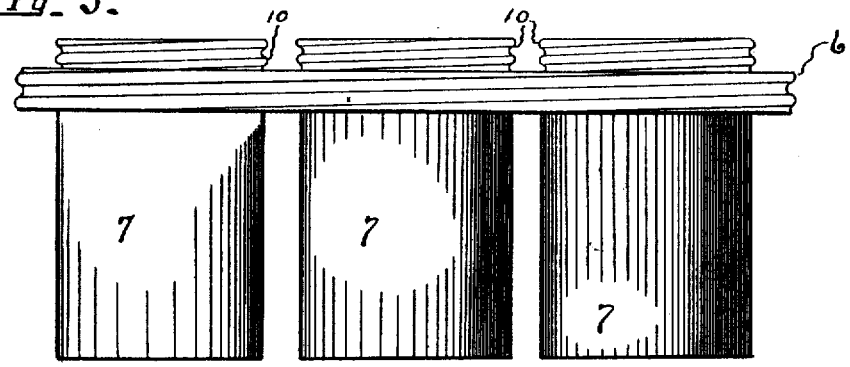

In the accompanying drawing, which illustrates one embodiment of the invention, Figure 1 is a view of the device in longitudinal section. Fig. 2 is a plan view of the same. Fig. 3 is a side view of the screw-cap of the brine-tank with cream receptacles mounted thereon.

Referring now to the drawing for a more particular description, numeral 4 indicates the container for the refrigerant, or brine tank. While I do not limit myself to form, I prefer a cylindrical construction, as shown in the drawing. The tank is provided with a terminal, upright, annular, grooved wall 5 to form the large opening as shown in the drawing.

I provide means for making an "air tight" closure for the brine tank, this being the screw-cap 6 therefor, and at 7 are indicated cream-receptacles, each provided with a screw-cap 8 with a handle 9 rigidly secured thereon. Since the screw-cap of the brine tank has a diameter nearly equal to the diameter of the tank, the latter is accessible for purposes of cleaning.

In operation, the refrigerant is first placed in tank 4. Cap 6 is then screwed upon wall 5, and screw-caps 8 are mounted upon the upper, grooved wall-portions 10 of receptacles 7 when the cream has been deposited in these containers; and since the tank and all of the receptacles mentioned are securely closed and rigidly connected, they may be manually shaken, as a unit or single article, as is apparent, for the purpose of causing the brine to absorb the heat from receptacles 7 and their contents; and the device as far as described would operate, in a measure to cause the desired results. In order, however, to prevent exposure of the brine tank to the atmosphere so that the cream may be more quickly frozen, and to the end that an undue amount of moisture will not be precipitated upon the surface of the brine tank, I provide a jacket or air-housing receptacle 11 therefor, the same having a diameter somewhat greater than the brine-tank and formed with an outwardly and upwardly flaring, terminal, annular ledge or flange 12.

Tank 4 is provided with an outwardly projecting annular flange 13 adapted to have a seating upon flange or ledge 12 of the jacket, whereby an air-chamber 14 is formed which circumscribes the brine tank.

The function discharged by the jacket is of great advantage. Where the refrigerant is confined in a tank of sheet metal and is exposed to the atmosphere, it is not practically effective for the reason that it absorbs the heat therefrom; by the use of the jacket, however, freezing of the cream in receptacles 7 is effected very quickly. Since receptacles 7 project above cap 6, they may be used as a holding means or as handles when partly rotating cap 6 for its removal from the brine-tank, or when mounting it thereon.

The herein described freezer is particularly adapted for domestic or household use. While I do not limit myself to the number of receptacles 7, I prefer to use a plurality thereof, and therefore the device discloses convenient means for preparing, by a single operation, creams or ices of different flavors; and it is considered that the contents of the brine tank can be more effectively agitated where a plurality of containers 7 are disposed adjacent to each other within the tank which is to be shaken.

In practice, after the contents of receptacles 7 have been suitably frozen, the brine tank may be conveniently removed by elevating it from the jacket, and at this time the surface of the brine tank will be comparatively dry since it has been protected by air chamber 14, for as is apparent, the moisture to be condensed or precipitated from the air within said chamber is quite limited; and if chamber 14 is not provided, the moisture from the atmosphere will generally cause the surface of the tank to be coated with water, this being an objectionable feature.

As a further description of operation it may be stated that the operator, for causing an agitation of the contents of the brine tank and food receptacles, manually grasps or supports the sides of container or jacket 11 and partly rotates it or swings it horizontally, or imparts to it a sudden pendulous movement. At this time the weight of the parts is sustained by ledge 12, flange 13 being disposed thereon. In order to prevent a sliding movement of the brine tank with reference to receptacle 11, I provide means to prevent such movement and to removably connect tank 4 with said outer receptacle, consisting of keepers or lugs 15 rigidly secured to the tank and adapted to have seatings in slots or recesses 16 formed in ledges 12.

Lugs 15 are disposed upon platforms 17 upon the annular flange 13 so that they will be located above this flange. Recesses or slots 16 open upon the upper edge of flange or ledge 12 of receptacle 11, and in practice, the lugs, while engaging in the slots, operate to reliably prevent a horizontally sliding movement of the brine tank upon ledge 12. Also, since lugs 15 are disposed somewhat above flange 13, slots 16 do not extend downward from the edge of the ledge a sufficient distance to communicate with chamber 14 after the brine tank has been seated within the air-housing receptacle.

Having fully described the several parts of my invention, a further explanation relating to operation is not needed.

What I claim and desire to secure by Letters Patent is,—

1. An ice cream freezer, comprising, in combination with a refrigerant container having an aperture with a grooved, annular wall, a screw-cap adapted to have a mounting upon said grooved wall; a cream receptacle having an aperture with a grooved, annular wall, said receptacle being mounted upon and traversing the screw-cap with its body-portion disposed dependingly within and its grooved, annular wall projecting above the screw-cap of said refrigerant container; and a screw-cap provided with a handle, for a closure for said cream receptacle.

2. An article of the class described, comprising, in combination with a refrigerant container having an outwardly projecting flange, an air-housing receptacle having a flaring outwardly-projecting ledge, a cover and cream receptacle, said receptacle being disposed transversely with reference to and supported between its ends by the cover and provided with a removable closure-cap; said refrigerant container adapted to have a seating within said air housing receptacle with its flange making contact with said ledge; said cover adapted to have a mounting upon said container, the lower end of the cream receptacle being disposed within and with its upper end projecting above said refrigerant container.

3. An article for the purpose described, comprising, in combination with a refrigerant container having an outwardly projecting flange; an air-housing receptacle having a flaring, outwardly-projecting ledge; a cover provided with a plurality of cream receptacles, said receptacles being disposed transversely with reference to and supported between their ends by the cover and provided with removable closure-caps; said refrigerant container adapted to have a seating within said air-housing receptacle with its flange in contact with said ledge; said cover adapted to have a mounting upon the container, the body portions of said receptacles being disposed dependingly within and with their upper end portions projecting above said refrigerant container.

4. An article for the purpose described, comprising, in combination with a refrigerant container having a grooved, annular wall inclosing an intake aperture and an annular outwardly-projecting flange; an air-housing receptacle provided with an annular, flaring upwardly projecting ledge, said refrigerant container adapted to have a seating within said air-housing receptacle with its flange disposed upon said ledge; a screw-cap adapted to have a mounting upon the grooved annular wall of the refrigerant container; a cream receptacle provided with a grooved annular wall inclosing an intake aperture and mounted upon and traversing said screw-cap, its body portion being disposed dependingly within and its grooved, annular wall projecting above the screw-cap of said refrigerant container; and a screw-cap provided with a handle, for a closure for said cream receptacle.

5. An article of the class described, comprising, in combination with a refrigerant container having an outwardly projecting flange with lugs projecting outwardly therefrom; an air-housing receptacle having a flaring, outwardly-projecting, recessed ledge; a combined cover and cream receptacle, said receptacle being disposed transversely with reference to and supported between its ends by the cover and provided with a removable closure-cap; said refrigerant container adapted to have a seating within said air-housing receptacle with its flange in contact with said ledge, the lugs of its flange engaging within said recesses of said ledge; said cover adapted to have a mounting upon said container, the lower end of the cream receptacle being disposed within and with its upper end projecting above said refrigerant container.

6. An article for the purpose described, comprising, in combination with a refrigerant container having an outwardly projecting flange with an outwardly-projecting lug secured thereon; an air-housing receptacle having a flaring, outwardly-projecting, recessed ledge; a cover provided with a plurality of cream receptacles, said receptacles being disposed transversely with reference to and supported between their ends by the cover and provided with removable closure-caps; said refrigerant container adapted to have a seating within said air-housing receptacle with its flange in contact with said ledge and with its lug in engagement with the recess of said air-housing receptacle; said cover adapted to have a mounting upon the container, the body portions of said receptacles being disposed dependingly within and with their upper end portions projecting above said refrigerant container.

7. An article for the purpose described, comprising, in combination with a refrigerant container having a grooved, annular wall inclosing an intake aperture and an annular outwardly-projecting, lug-bearing flange; an air-housing receptacle provided with an annular, flaring, upwardly-projecting, recessed ledge, said refrigerant container adapted to have a seating within said air-housing receptacle with its flange disposed upon and with its lug engaging the recess of said ledge; a screw-cap adapted to have a mounting upon the grooved, annular wall of the refrigerant container; a cream receptacle having an intake aperture with a grooved, annular wall, said cream receptacle being mounted upon and traversing said screw-cap with its body portion disposed dependingly within and its grooved annular wall projecting above the screw-cap of said refrigerant container; and a screw-cap provided with a handle for a closure for said cream receptacle.

8. In combination, a housing receptacle having an annular, outwardly-flaring recessed ledge, a brine tank having an annular neck portion with a closure cap therefor and provided with an outwardly-projecting, lug-bearing, annular flange adjacent to said neck portion, a plurality of containers disposed in the brine tank and supported by said closure cap, said brine tank adapted to be disposed within said housing receptacle with its annular flange in engagement with the flaring ledge of said housing receptacle with the lugs of its flange seated in said recesses.

9. In combination, a housing receptacle having an annular outwardly flaring ledge, a brine tank having an annular neck portion with a closure cap therefor and provided with an outwardly projecting annular flange adjacent to said neck portion; a receptacle disposed dependingly in the brine tank and supported by said closure cap; said brine tank being adapted to be disposed within the housing receptacle with its annular flange seated upon the outwardly flaring ledge of said housing receptacle; and means to prevent an edgewise movement of the annular flange of the brine tank while seated upon the ledge of said housing receptacle.

In testimony whereof I have affixed my signature in presence of two witnesses.

ALICE O. McCANN.

Witnesses:
HIRAM A. STURGES,
C. W. PACE.